US011681976B2

(12) United States Patent
Dasika et al.

(10) Patent No.: US 11,681,976 B2
(45) Date of Patent: Jun. 20, 2023

(54) AUTOMATED EXCEPTION EVENT HANDLER FOR RESOLVING SHIPPING EXCEPTIONS

(71) Applicant: WALMART APOLLO, LLC, Bentonville, AR (US)

(72) Inventors: Saujanya Dasika, Hyderabad (IN); Karpagavalli Jaykumar, Chennai (IN); Raju Chautagi, Bangalore (IN); Sailaja Kota, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 265 days.

(21) Appl. No.: 15/882,298

(22) Filed: Jan. 29, 2018

(65) Prior Publication Data

US 2019/0236541 A1 Aug. 1, 2019

(51) Int. Cl.
*G06Q 10/08* (2023.01)
*G06Q 10/0835* (2023.01)
(Continued)

(52) U.S. Cl.
CPC ......... *G06Q 10/0835* (2013.01); *G06F 3/048* (2013.01); *G06Q 10/0832* (2013.01); *G06Q 10/0833* (2013.01); *H04W 4/35* (2018.02)

(58) Field of Classification Search
CPC .. G06Q 10/08; G06Q 10/083; G06Q 10/0832; G06Q 10/0833; G06Q 10/0834;
(Continued)

(56) References Cited

U.S. PATENT DOCUMENTS

2002/0095347 A1* 7/2002 Cummiskey ........... G06Q 40/04
705/26.1
2003/0149674 A1* 8/2003 Good ..................... G06Q 10/08
705/402

(Continued)

OTHER PUBLICATIONS

Definition of "stream,"foldoc.org, http://foldoc.org/stream (Year: 1996).*

(Continued)

*Primary Examiner* — Resha Desai
*Assistant Examiner* — Michelle E Carey
(74) *Attorney, Agent, or Firm* — Bryan Cave Leighton Paisner LLP

(57) ABSTRACT

A system includes one or more processing modules and one or more non-transitory storage modules storing computing instructions configured to run on the one or more processing modules and perform acts of: configuring an exception event handler for a delivery system with a ruleset that enables proactive identification and resolution of delivery exceptions; monitoring a queue of incoming messages that are received from carriers indicating status information for shipments being handled by the carriers; detecting a first delivery exception for a first incoming message regarding first status information for a first shipment of products; determining a first exception type for the first delivery exception based on the ruleset; selecting, based at least in part on the exception type, a first automated corrective measure for the first delivery exception; and automatically executing the first automated corrective measure to resolve the first delivery exception. Other embodiments are disclosed herein.

20 Claims, 6 Drawing Sheets

(51) Int. Cl.
*G06Q 10/0833* (2023.01)
*G06Q 10/0832* (2023.01)
*G06F 3/048* (2013.01)
*H04W 4/35* (2018.01)

(58) Field of Classification Search
CPC ......... G06Q 10/0835; G06Q 10/08355; G06Q 10/0837; G06Q 10/0838; H04W 4/35; H04W 4/04; G06F 3/048
USPC .......................... 705/5–6, 330–334, 400–418
See application file for complete search history.

(56) References Cited

U.S. PATENT DOCUMENTS

| | | | | |
|---|---|---|---|---|
| 2006/0085203 | A1* | 4/2006 | Schweickart | G06Q 10/0838 705/341 |
| 2007/0005452 | A1* | 1/2007 | Klingenberg | G06Q 10/0834 705/334 |
| 2010/0250446 | A1* | 9/2010 | Mackenzie | G06Q 50/188 705/80 |
| 2012/0259918 | A1* | 10/2012 | Bringer | G06F 9/542 709/204 |
| 2014/0075446 | A1* | 3/2014 | Wang | G06F 21/40 718/104 |
| 2015/0100514 | A1* | 4/2015 | Parris | G06Q 10/083 705/340 |
| 2016/0171439 | A1* | 6/2016 | Ladden | G06F 3/0484 705/340 |
| 2016/0290811 | A1* | 10/2016 | Watterson | B61L 27/12 |
| 2017/0061376 | A1* | 3/2017 | Wagner | G06Q 10/0838 |
| 2018/0165635 | A1* | 6/2018 | Modica | H04L 67/025 |

OTHER PUBLICATIONS

Grigori, Daniela et al., "Improving Business Process Quality through Exception Understanding, Prediction, and Prevention," Proceedings of the 27th VLDB Conference, Roma, Italy, 2001, retrieved from https://citeseerx.ist.psu.edu/document?repid=rep1&type=pdf&doi=9151541a84d25e31a1101e82a4b345639223bbd8 (Year: 2001).*

* cited by examiner

400

410— Configuring an exception event handler with a ruleset that enables proactive identification and resolution of delivery exceptions

420— Detecting a delivery exception by monitoring a queue of incoming messages that are received from a carrier indicating status information for a shipment being handled by the carrier

430— Determining an exception type for the delivery exception based on the ruleset

440— Selecting an automated corrective measure based, at least in part ,on the exception type

450— Executing the automated corrective measure to resolve the delivery exception

FIG. 4

AUTOMATED EXCEPTION EVENT HANDLER FOR RESOLVING SHIPPING EXCEPTIONS

TECHNICAL FIELD

This disclosure relates generally to exception event handlers that can be utilized in a delivery system to proactively identify and resolve shipping exceptions using automated corrective measures.

BACKGROUND

Many companies utilize government or private carriers to deliver products to customers. In some cases, errors occur while shipments are being delivered to the customers. Shipping errors include products being damaged, shipments being lost in transit, and/or shipments being delayed beyond an expected delivery date. Unless a customer is continuously and actively tracking the shipment, the customer will not be aware of a shipping error. Moreover, even if the customer manages to determine that an error has occurred, the customer must then contact the company from which the shipment was ordered to resolve the issues. This additional work by the customer can often result in the customer becoming frustrated with the company that sold the products, thereby causing the company to lose business from the customer.

BRIEF DESCRIPTION OF THE DRAWINGS

To facilitate further description of the embodiments, the following drawings are provided in which:

FIG. 4 is a flowchart for a method according to certain embodiments;

Figure 1:
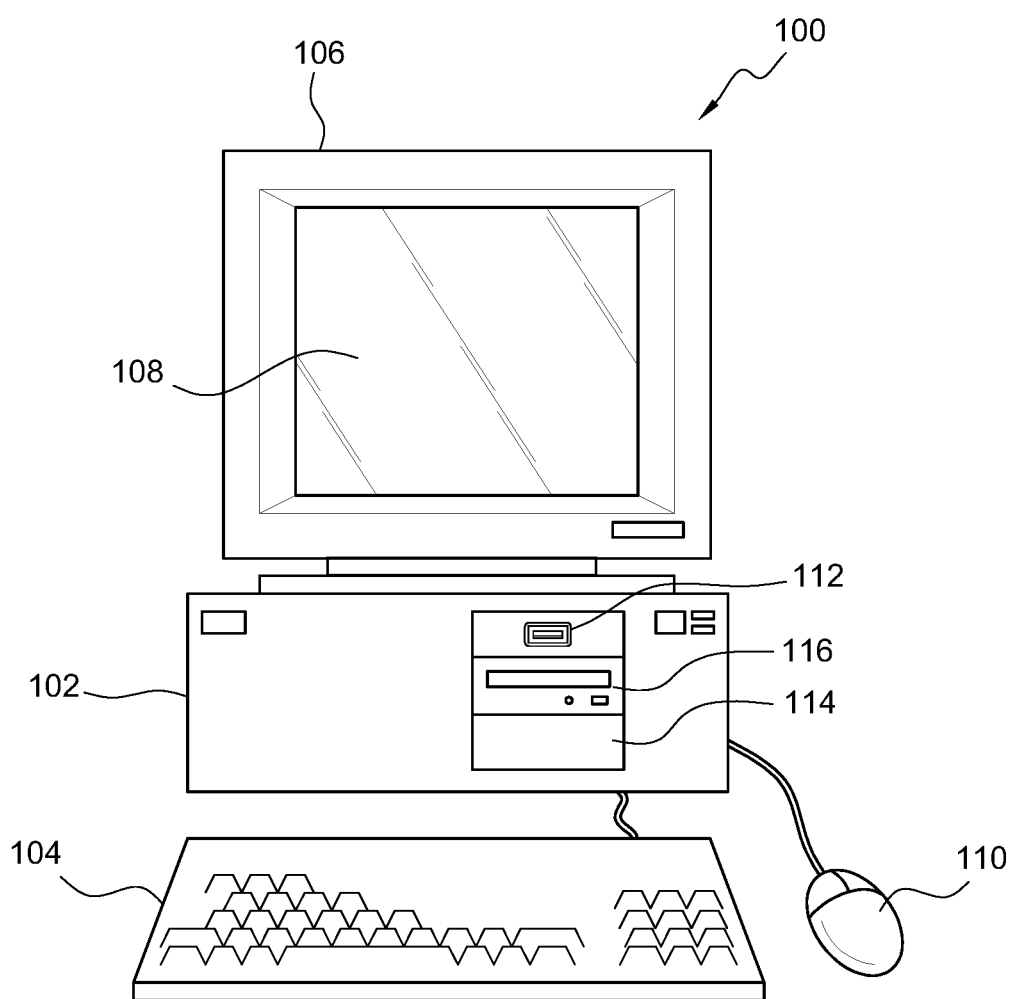
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
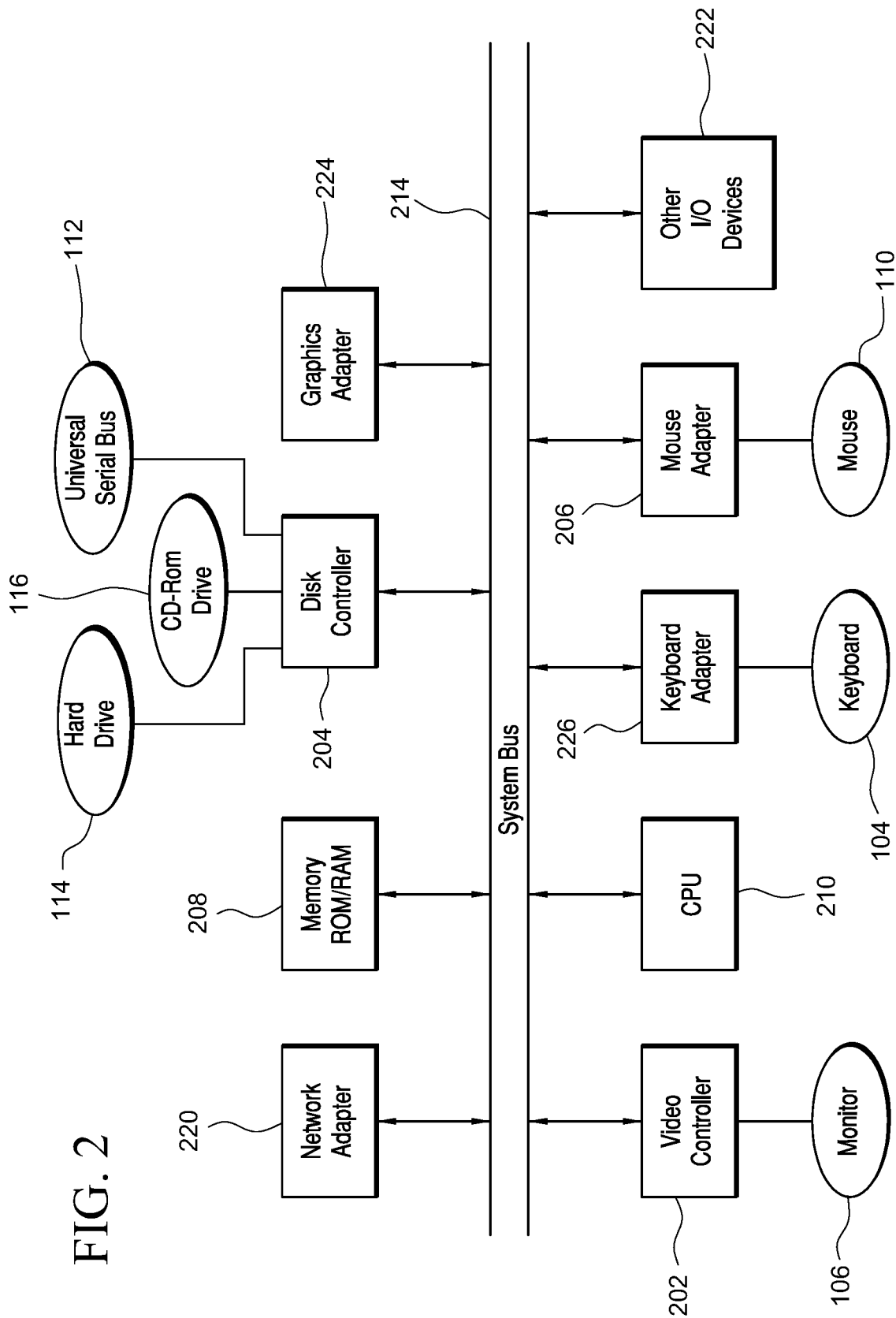
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
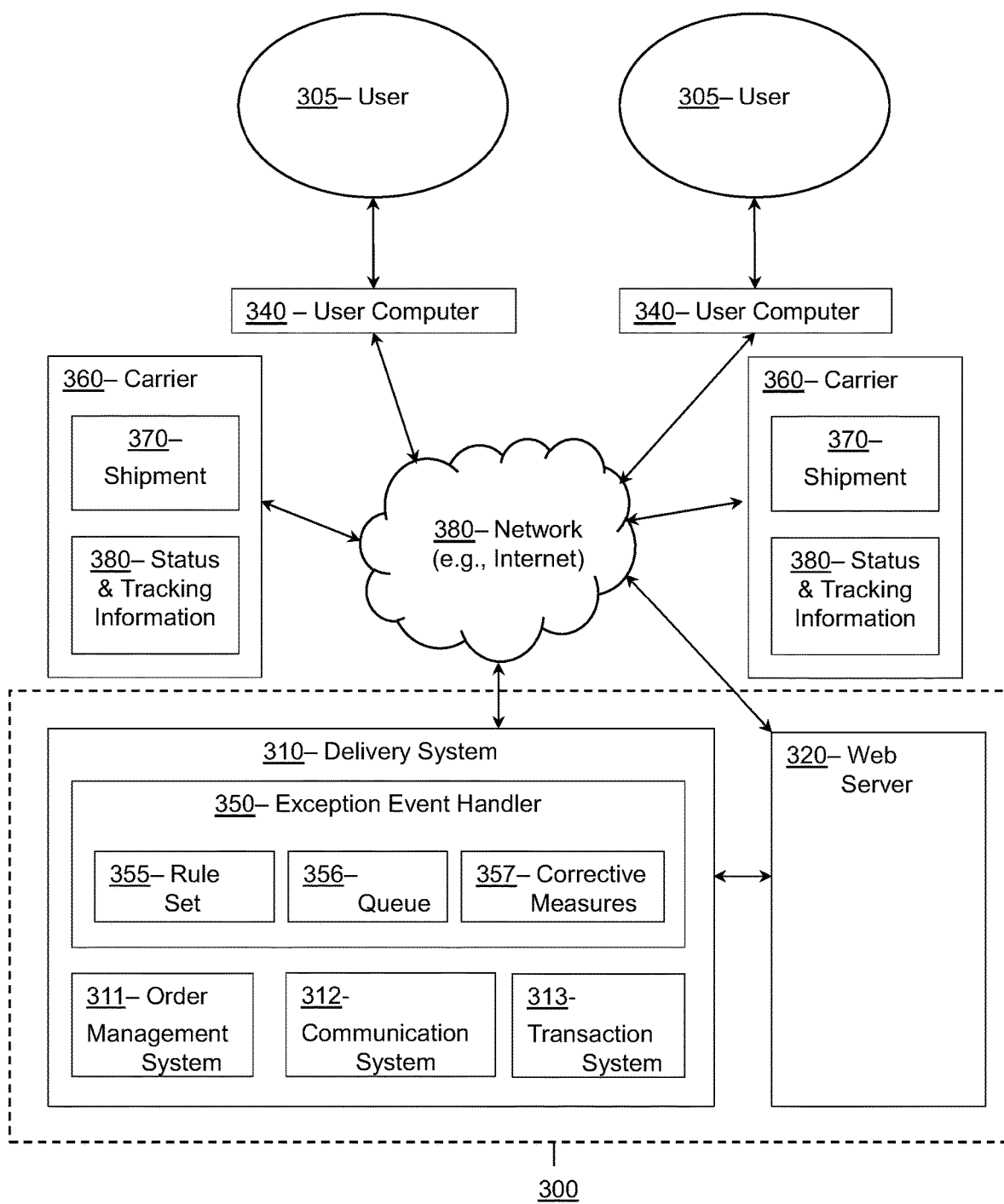
FIG. 3 illustrates a representative block diagram of a system according to certain embodiments.

Turning ahead in the drawings, FIG. 3 illustrates a block diagram of a system 300 that can be employed for proactively detecting and resolving delivery exceptions as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a delivery system 310, which can include an order management system 311, a communication system 312, a transaction system 313, and an exception event handler 350. System 300 also can include a web server 320, and can be coupled to one or more carriers 360 via a network 380 (e.g., the Internet). The delivery system 310, order management system 311, communication system 312, transaction system 313, web server 320, exception event handler 350, and carriers 360 can each be or include a computer system, such as computer system 100 (FIG. 1), as described above, and can each be a single computer, a single server, or a cluster or collection of computers or servers, or a cloud of computers or servers. In another embodiment, a single computer system can host each of two or more the delivery system 310, order management system 311, communication system 312, transaction system 313, web server 320, exception event handler 350, and carriers 360. Additional details regarding the delivery system 310, order management system 311, communication system 312, transaction system 313, web server 320, exception event handler 350, and carriers 360 are described herein.

In many embodiments, system 300 also can comprise user computers 340. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through network 330 with user computers (e.g., 340). In certain embodiments, user computers 340 can be desktop computers, laptop computers, smart phones, tablet devices, and/or other endpoint devices. Web server 320 can host one or more websites. For example, web server 320 can host an online shopping website that allows users to browse and/or search for products, to add products to an electronic shopping cart, and/or to purchase products, in addition to other suitable activities.

In many embodiments, delivery system 310, order management system 311, communication system 312, transaction system 313, web server 320, exception event handler 350, and carriers 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) for the delivery system 310, order management system 311, communication system 312, transaction system 313, web server 320, exception event handler 350, and carriers 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the delivery system 310, order management system 311, communication system 312, transaction system 313, web server 320, exception event handler 350, and carriers 360. In a similar manner, the processing module(s) and the memory storage module(s) can be local and/or remote to each other.

In many embodiments, the delivery system 310, order management system 311, communication system 312, transaction system 313, web server 320, exception event handler 350, and carriers 360 can be configured to communicate with one or more user computers 340. In some embodiments, user computers 340 also can be referred to as customer computers. In some embodiments, the delivery system 310, order management system 311, communication system 312, transaction system 313, web server 320, exception event handler 350, and carriers 360 can communicate or interface (e.g., interact) with one or more customer computers (such as user computers 340) through a network 330, e.g., such as one that includes the Internet. Network 330 can be an intranet that is not open to the public. Accordingly, in many embodiments, the delivery system 310, order management system 311, communication system 312, transaction system 313, web server 320, exception event handler 350, and carriers 360 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 also can be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the delivery system 310, order management system 311, communication system 312, transaction system 313, web server 320, exception event handler 350, and carriers 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between the delivery system 310, order management system 311, communication system 312, transaction system 313, web server 320, exception event handler 350, and carriers 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

A number of embodiments described herein can include a system. The system can include one or more processing modules and one or more non-transitory storage modules storing computing instructions configured to run on the one or more processing modules. The one or more storage modules can be configured to run on the one or more processing modules and perform the acts of: configuring an exception event handler for a delivery system with a ruleset that enables proactive identification and resolution of delivery exceptions; monitoring a queue of incoming messages that are received from carriers indicating status information for shipments being handled by the carriers; detecting a first delivery exception for a first incoming message from a first carrier regarding first status information for a first shipment of products being handled by the first carrier, wherein the incoming messages comprise the first incoming message, the carriers comprise the first carrier, the status information comprises the first status information, and the shipments comprise the first shipment of products; determining a first exception type for the first delivery exception based on the ruleset; selecting, based at least in part on the exception type, a first automated corrective measure for the first delivery exception for the first incoming message from the first carrier regarding the first status information for the first shipment of products being handled by the first carrier; and automatically executing the first automated corrective measure for the first shipment of products to resolve the first delivery exception.

Various other embodiments described herein include a method. The method can include: configuring an exception event handler for a delivery system with a ruleset that enables proactive identification and resolution of delivery exceptions; monitoring a queue of incoming messages that are received from carriers indicating status information for shipments being handled by the carriers; detecting a first delivery exception for a first incoming message from a first carrier regarding first status information for a first shipment of products being handled by the first carrier, wherein the incoming messages comprise the first incoming message, the carriers comprise the first carrier, the status information comprises the first status information, and the shipments comprise the first shipment of products; determining a first exception type for the first delivery exception based on the ruleset; selecting, based at least in part on the exception type, a first automated corrective measure for the first delivery exception for the first incoming message from the first carrier regarding the first status information for the first shipment of products being handled by the first carrier; and automatically executing the first automated corrective measure for the first shipment of products to resolve the first delivery exception.

Delivery exceptions (also referred to herein as "shipping exceptions") can result from shipments being damaged, lost, delayed. Conventional techniques for handling and resolving the delivery exceptions are largely unsuccessful for a variety of reasons. One problem is that customers are not timely notified of a delivery exception unless they are actively tracking the shipment (e.g., using a tracking feature on a website of the carrier). Another problem is that customers are often required to contact the seller (e.g., retailer, merchant, or online shopping store) from which the shipment was ordered to resolve the issue. Furthermore, the customer's feedback is not solicited by the seller to determine the best manner of resolving the delivery exception.

The principles discussed in this disclosure provide automated techniques for proactively detecting and resolving delivery exceptions. Generally speaking, these techniques involve monitoring a queue of incoming messages received from carriers to detect when delivery exceptions have occurred, and automatically executing one or more corrective measures (e.g., automatically ordering replacement items, issuing refunds, transmitting notifications to the customer, and/or soliciting customer feedback) to resolve the delivery exceptions in a quick and efficient manner. The types of corrective measures taken, and the delivery exceptions detected, are both customizable in various ways. The system can be easily extended to account for additional delivery exceptions and corrective actions, and to integrate new carriers.

Customers (e.g., users 305) can place orders for shipments 370 with a delivery system 310 in a variety of different ways (e.g., via a website, by phone, or in-person at a store location). In certain embodiments, the delivery system 310 can be utilized by a retailer, online shopping site, wholesaler, or other entity that delivers products or other items. The delivery system 310 is configured to schedule and arrange for the orders to be delivered to the customers. Each of the orders can include one or more items (e.g., products, articles, and/or tangibles), and the delivery system 310 is configured to perform all functions associated with managing the logistics associated with fulfilling, packaging, and preparing the orders to be shipped to the customers. The delivery system 310 is also configured to monitor the status of the orders once they have been shipped, and to resolve any issues associated with shipping the orders to customers.

One or more carriers 360 can be utilized to transport the shipments 370 from the delivery system 310 (e.g., from a retail location, warehouse, or shipping center associated with a retailer operating the delivery system 310) to the customers (e.g., to residences or business locations associated with the users 305). The carriers 360 can represent third-party delivery services (e.g., such as the United States Postal Service (USPS), United Parcel Service (UPS), Dalsey Hillblom and Lynn (DHL), Federal Express (Fed-Ex), or Uber), or the carriers 360 can represent transportation services provided by the seller (e.g., retailer or other entity) that is fulfilling the order. Each of the carriers 360 can include vehicles (e.g., trucks, planes, boats, and/or automated drones) for transporting the shipments 370 to the customers or users 305. Each of the carriers 360 can further include communication devices for communicating status and tracking information 380 associated with the shipments 370 to the delivery system 310 and/or customers (e.g., users 305).

The status and tracking information 380 transmitted to the delivery system 310 and/or customers can include messages that provide updates on the progress of the shipments 370, for example, indicating when the shipments 370 have been placed in transport, identifying locations or hubs that the shipments 370 have reached during the delivery process, indicating when the shipments 370 have been delivered to the customers, and providing updates on expected delivery dates and times. The status and tracking information 380 transmitted to the delivery system 310 and/or customers (e.g., users 305) can include messages that identify delivery exceptions, for example, indicating when shipments 370 are lost, damaged, or delayed. Each of the messages can include codes that identify the events that are the subject of the messages. Each carrier 360 can transmit messages for different types of events, and each carrier 360 can utilize a unique set of codes for identifying the events. For example, one message can include a first code that indicates when a shipment 370 has been damaged; a second message can include a second code that indicates that a shipment 370 has been lost in transit; a third message can include a third code that indicates that a shipment 370 will be delivered late to the customer after an expected shipping date; a fourth message can include a fourth code indicating that a shipment 370 has left a warehouse for delivery; and a fifth message can include a fifth code indicating that a shipment 370 was successfully delivered to a customer. A different carrier can transmit messages for similar types of events, but can associate different codes with the messages to identify the events. Other types of messages and codes can be utilized.

All of the messages received by the delivery system 310 are loaded into and stored in a queue 356. In certain embodiments, the queue 356 can represent a first-in-first-out (FIFO) data structure that enables the messages to be processed in the order that the messages are received. For the purposes of this disclosure, it should be understood that the queue 356 can generally represent any data structure that is capable of receiving and storing the messages and, in some cases, also can represent a database, linked list, array, and/or tree structure.

An exception event handler 350 actively monitors the queue 356 in real-time or periodically to detect when new messages have been received. In response to receiving new messages, the exception event handler 350 utilizes a ruleset 355 to identify the event that is the subject of the message and to determine if any corrective measures 357 should be taken. More specifically, the exception event handler 350 utilizes the ruleset 355 to analyze and/or parse the content of the messages to identify the codes associated with the messages. The exception event handler 350 utilizes a lookup table associated with the carrier 360 that transmitted the message to identify the type of event associated with the message (e.g., to determine the purpose of the message). If the code associated with a message indicates that the message relates to a delivery exception, then the exception event handler 350 flags the message, and utilizes the ruleset 355 to automatically take corrective measures 357 for resolving the delivery exception. In some embodiments, exception event handler 350 can automatically take the corrective measures 357 without soliciting additional information from the customer or otherwise contacting the customer.

As mentioned above, the delivery exceptions can indicate that a shipment 370 was damaged, lost, delayed, or otherwise experienced trouble while in transit. The exception event handler 350 can be configured to automatically execute a variety of different corrective measures 357 in response to detecting a delivery exception. Exemplary corrective measures include any or all of the following: (1) automatically issuing a refund to a customer; (2) automatically scheduling one or more replacement products or items to be delivered to a customer; (3) automatically transmitting a notification to the customer (e.g., via an e-mail or mobile text message) to notify the customer of the delivery exception and other related information; and/or (4) automatically soliciting feedback from the customer to determine the customer's preference for handling the delivery exception. Other types of corrective measures 357 also can be taken.

The exception event handler 350 can communicate with an order management system 311, a communication system 312, and/or a transaction system 313 to implement the corrective measures 357. In some embodiments, the exception event handler 350 can be integrated with the order management system 311, communication system 312, and/or transaction system 313, or can be in communication with these components over a network 380.

The order management system 311 can store information associated with products (including services) that are being offered for sale, for example, by a retailer associated with the delivery system 310. The exception event handler 350 can be configured to communicate with the order management system 311 for submitting replacement orders in response to detecting a delivery exception. For example, the exception event handler 350 can communicate with the order management system 311 to check inventory levels to ensure that replacement items are available for delivery, and to schedule the replacement items to be delivered to the customer. If replacement items are not available (e.g., because they are no longer in stock or have been sold out), the order management system 311 can select similar items to recommend to the customer and/or deliver to the customer.

The exception event handler 350 can utilize the communication system 312 to communicate with the customers and/or carriers 360 using a variety of communication tools. For example, the exception event handler 350 can utilize the communication system 312 to transmit notifications to and/or solicit feedback from the customers in response to detecting a delivery exception. The communication system 312 can be configured to communicate with the customers and/or carriers 360 via e-mail messages, phone calls (e.g., automated phone calls), mobile text messages, instant messaging tools, inbox messages (e.g., received via an account hosted by the retailer or merchant), and/or any other form of communication.

The exception event handler 350 also can communicate with the transaction system 313 in response to detecting a delivery exception. The transaction system 313 can be configured to provide refunds, store credits, and/or loyalty program rewards to customers. In response to the exception event handler 350 contacting customers because of detected delivery exceptions, the transaction system 313 also can enable the customers to purchase alternative items (e.g., if damaged or lost items are no longer in stock) and/or additional items after delivery exceptions are detected.

The ruleset 355 can include customizable rules for implementing any of the above-mentioned activities associated with detecting the delivery exceptions and executing corrective measures 357 for resolving the delivery exceptions. More specifically, the ruleset 355 can include a customized subset of rules for each carrier 360. The rules for each carrier 360 can be utilized to specify delivery exceptions for the carrier 360, to decode and translate the messages and associated codes (e.g., to determine when delivery exceptions have occurred), and to determine appropriate corrective measures 357 that should be taken when delivery exceptions occur for that carrier 360. The ruleset 355 also can allow corrective measures 357 to be customized to the customers (e.g., users 305). For example, users 305 can be permitted to log in to an online account provided by a retailer associated with the delivery system 310, and to specify user preferences for handling shipping exceptions. The user preferences are then stored in the ruleset 355 and utilized by the exception event handler 350 to take corrective measures 357 when delivery exceptions are detected for shipments 370 placed by the customer. In these embodiments, as an example, exception event handler 350 does not need to contact the user after identifying the delivery exception and before automatically executing the corrective measure.

In certain embodiments, the ruleset 355 can be extended to proactively take actions for events other than delivery exceptions. For example, the exception event handler 350 can be configured with the ruleset 355 to analyze messages received in the queue 356 in order to detect events that are not delivery exceptions (e.g., events indicating when shipments 370 have left a warehouse and/or arrived at a customer location). The exception event handler 350 can then execute automated actions to provide a better customer experience. Exemplary actions that can be taken can include requesting user ratings with respect to delivering the shipments, asking customers if shipments should automatically be re-ordered on a recurring basis, and asking customers if they would like complimentary, supplementary or related products to be ordered and delivered that are associated with the items in shipment. Other types of actions also can be taken.

As evidenced by the disclosure herein, the principles set forth in the disclosure are rooted in computer technologies that overcome existing problems in known delivery systems, specifically problems dealing with notifying customers of shipping exceptions and executing corrective actions in a timely manner. Known delivery systems do not proactively notify customers when delivery exceptions have occurred, nor do they allow automated corrective measures to be undertaken once the delivery errors have been detected. The principles described in this disclosure provide a technical solution (e.g., one that utilizes real-time monitoring of an incoming message stream and executes automated corrective measures based on detected exception events in the stream) for overcoming such problems. This technology-based solution marks an improvement over existing computing capabilities and functionalities related to delivery systems by automating the execution of the corrective measures and decreasing timeframes for detecting exception events. The novel delivery systems are designed to improve the way delivery tracking systems detect exception events and the manner in which detected exceptions are handled.

Figure 6:
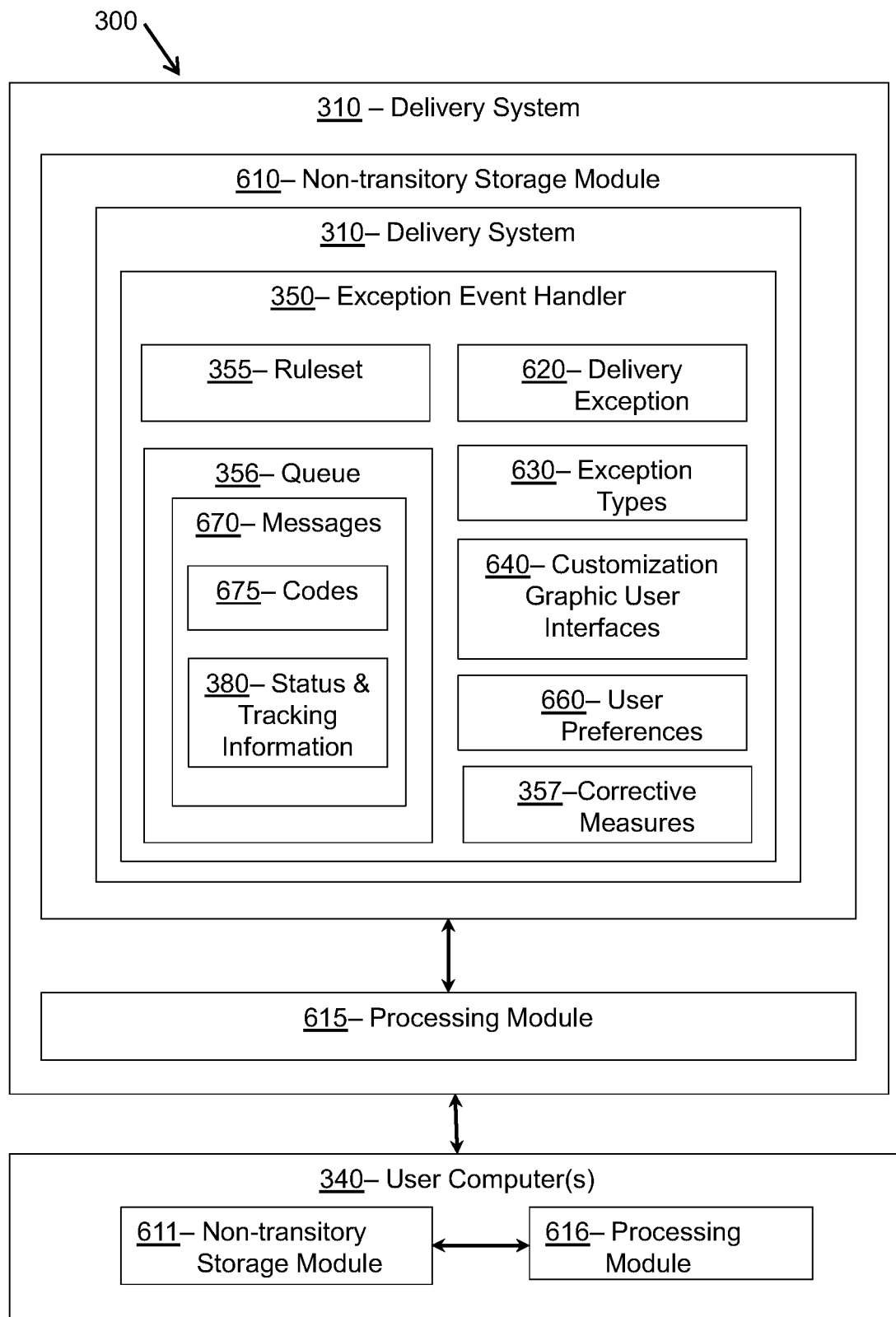
FIG. 6 illustrates a representative block diagram of a portion of the system of FIG. 3 according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 610, 611 (FIG. 6). Such non-transitory memory storage modules can be part of a computer system such as delivery system 310 (FIGS. 3 & 6). The processing module(s) can be similar or identical to the processing module(s) described above with respect to computer system 100 (FIG. 1).

Method 400 can comprise an activity 410 of configuring an exception event handler 350 (FIGS. 3 & 6) for a delivery system 310 (FIGS. 3 & 6) with a ruleset 355 (FIGS. 3 & 6) that enables proactive identification and resolution of delivery exceptions 620 (FIG. 6). The ruleset 355 (FIGS. 3 & 6) can be customized for each carrier 360 (FIG. 3) to detect specific types of delivery exceptions 620 (FIG. 6) for each of the carriers 360 (FIG. 3), and to take specific types of corrective measures 357 (FIGS. 3 & 6) in response to detecting delivery exceptions 620 (FIG. 6). The ruleset 355 (FIGS. 3 & 6) also can be customized based on user preferences 660 (FIG. 6) indicated by the customers. The user preferences 660 (FIG. 6) allow the customers to specify corrective measures 357 (FIGS. 3 & 6) that are to be taken automatically in response to detecting delivery exceptions 620 (FIG. 6).

Method 400 can further comprise an activity 420 of detecting a delivery exception 620 (FIG. 6) by monitoring a queue 356 (FIGS. 3 & 6) of incoming messages 670 (FIG. 6) that are received from a carrier 360 (FIG. 3) indicating status information for a shipment 370 (FIG. 3) being handled by the carrier 360 (FIG. 3). As explained above, each carrier 360 (FIG. 3) that interacts with the delivery system 310 (FIGS. 3 & 6) can transmit messages 670 (FIG. 6) to the delivery system 310 (FIGS. 3 & 6) that provide status and tracking information 380 (FIGS. 3 & 6) for shipments 370 (FIG. 3) being handled by the carrier 360 (FIG. 3). These messages 670 (FIG. 6) can be stored in the queue 356 (FIGS. 3 & 6) and can include codes that identify events associated with the messages 670 (FIG. 6). The exception event handler 350 (FIGS. 3 & 6) can monitor the queue 356 (FIGS. 3 & 6) in real-time to monitor events associated with the shipments 370 (FIG. 3), and to detect when delivery exceptions 620 (FIG. 6) have occurred.

Method 400 can further comprise an activity 430 of determining an exception type 630 (FIG. 6) for the delivery exception 620 (FIG. 6) based on the ruleset 355 (FIGS. 3 & 6). The exception type 630 (FIG. 6) can identify the type of event associated with the shipping error that has been detected. For example, the exception type 630 (FIG. 6) can indicate that the delivery exception 620 (FIG. 6) relates to a damaged shipment 370 (FIG. 3), a lost shipment 370 (FIG. 3), or a delayed shipment 370 (FIG. 3). The exception type 630 (FIG. 6) can be detected by analyzing the codes 675 (FIG. 6) that are included in the messages 670 (FIG. 6) or by analyzing other information included in the messages 670 (FIG. 6).

Method 400 can further comprise an activity 440 of selecting an automated corrective measure 357 (FIGS. 3 & 6) based, at least in part, on the exception type 630 (FIG. 6). The ruleset 355 (FIGS. 3 & 6) can specify that each delivery exception should be resolved or handled by executing one or more pre-determined corrective measures 357 (FIGS. 3 & 6). The selection of the corrective measures 357 (FIGS. 3 & 6) can be based, at least in part, on the user preferences 660 (FIG. 6) specified by the customers and/or based on customized rules for the carriers 360 (FIG. 3). Exemplary corrective measures 357 (FIGS. 3 & 6) can include issuing a refund, submitting an order for a replacement shipment, transmitting notifications to customers, and/or soliciting customer feedback for determining how to handle the delivery exception 620 (FIG. 6).

Method 400 can further comprise an activity 450 of executing the automated corrective measure 357 (FIGS. 3 & 6) to resolve the delivery exception 620 (FIG. 6). This activity 450 can involve the exception event handler 350 (FIGS. 3 & 6) transmitting signals to, and communicating with, an order management system 311 (FIG. 3), a communication system 312 (FIG. 3) and/or a transaction system 313 (FIG. 3) to implement the selected corrective measures 357 (FIGS. 3 & 6). For example, the exception event handler 350 (FIGS. 3 & 6) can communicate with an order management system 311 (FIG. 3) to submit orders for replacement shipments, a communication system 312 (FIG. 3) to transmit notifications and solicit feedback from customers, and/or a transaction system 313 (FIG. 3) to issue refunds to the customers.

Figure 5:
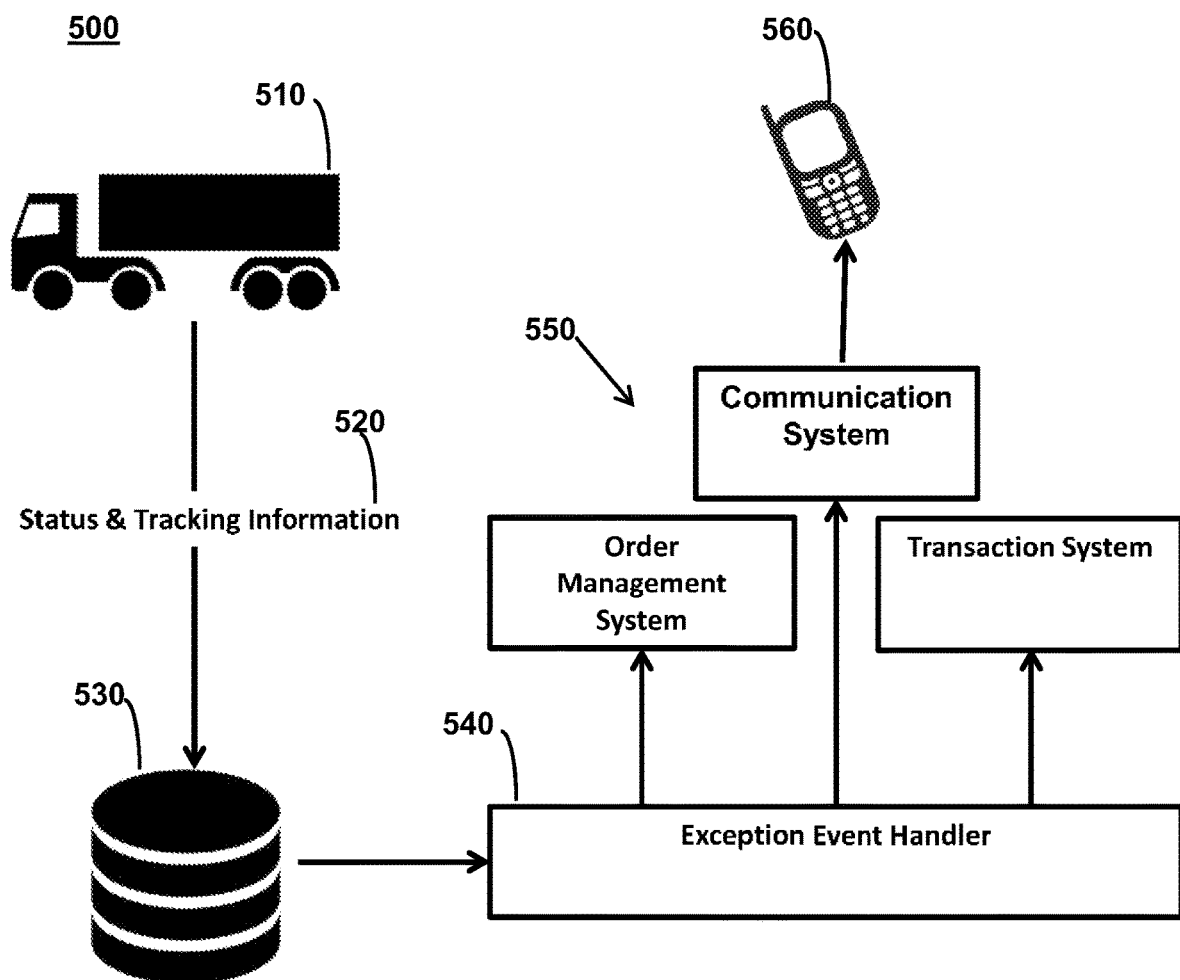
FIG. 5 is a process flow diagram according to certain embodiments.

FIG. 5 illustrates a process flow diagram 500 according to certain embodiments of a system. The process depicted in the process flow diagram 500 is merely exemplary and is not limited to the embodiments presented herein. It should be recognized that the process can be modified in various ways.

At 510, one or more shipments 370 (FIG. 3) are being delivered by a carrier 360 (FIG. 3). The carrier can transport the shipments 370 (FIG. 3) utilizing a variety of different vehicles including, but not limited to, motor vehicles (e.g., cars and trucks), aircraft (e.g., planes and helicopters), sea vessels (e.g., boats or shipping transports), and/or automated drones (e.g., an automated or remote-controlled vehicle, such as an aircraft or motor vehicle, that does not include a human operator).

At 520, the carrier 360 (FIG. 3) transmits status and tracking information 380 (FIGS. 3 & 6) associated with the shipments 370 (FIG. 3) being delivered. In certain embodiments, the vehicle (or operator of the vehicle) includes one or more communication devices (e.g., such as user computer 340 in FIG. 1) that is configured to transmit the status and tracking information 380 (FIGS. 3 & 6). The status and tracking information 380 (FIGS. 3 & 6) also can be transmitted by communication devices utilized by other individuals in the delivery process (e.g., by individuals who scan packages at hubs or locations along the delivery route). The status and tracking information 380 (FIGS. 3 & 6) can indicate various benchmarks pertaining to the delivery of each shipment 370 (FIG. 3). For example, the status and tracking information 380 (FIGS. 3 & 6) can indicate when a shipment 370 (FIG. 3) is loaded onto a vehicle, when the shipment 370 (FIG. 3) arrives at certain intermediate destinations or hubs along the delivery route, and when the shipment 370 (FIG. 3) is delivered to the customer. The status and tracking information 380 (FIGS. 3 & 6) also can indicate whether any delivery exceptions 620 (FIG. 6) have occurred for a shipment 370 (FIG. 3). As explained above, the delivery exceptions can include identifying whether a shipment 370 (FIG. 3) has been damaged, lost, and/or delayed.

At 530, the status and tracking information 380 (FIGS. 3 & 6) is received by the delivery system 310 (FIGS. 3 & 6) and stored in a queue 356 (FIGS. 3 and 6), database, or other data structure. The status and tracking information 380 (FIGS. 3 & 6) can comprise a plurality of messages 670 (FIG. 6) pertaining to the shipments, and the messages 670 (FIG. 6) can be stored according to a FIFO ordering. The queue 356 (FIGS. 3 and 6) can be stored on a server or computing device associated with the delivery system 310 (FIGS. 3 & 6).

At 540, the messages 670 (FIG. 6) stored in the queue 356 (FIGS. 3 & 6) are analyzed by the exception event handler 350 (FIGS. 3 & 6) in real-time or, in some cases, periodically. The exception event handler 350 (FIGS. 3 & 6) analyzes the messages 670 (FIG. 6) to identify whether any delivery exceptions 620 (FIG. 6) have occurred for any of the shipments 370 (FIG. 3) being delivered by the carrier 360 (FIG. 3).

At 550, the exception event handler 350 (FIGS. 3 & 6) initiates communication with an order management system 311 (FIG. 3), a communication system 312 (FIG. 3), and/or a transaction system 313 (FIG. 3) associated with the delivery system 310 to execute corrective measures 357 (FIGS. 3 & 6) for any delivery exceptions 620 (FIG. 6) that have been detected. As mentioned above, the corrective measures 357 (FIGS. 3 & 6) can include automatically issuing refunds to the customers affected by the delivery exceptions 620 (FIG. 6), automatically communicating with the customers affected by the delivery exceptions 620 (FIG. 6), and/or automatically sending replacement orders to the customers affected by the delivery exceptions 620 (FIG. 6).

At 560, the exception event handler 350 (FIGS. 3 & 6) utilizes the communication system 312 (FIG. 3) to communicate with user computers 340 (FIGS. 3 & 6) associated with the customers (e.g., users 305 in FIG. 3). Communication with the user computers 340 (FIGS. 3 & 6) can be performed in connection with executing the corrective measures (e.g., to solicit feedback and/or to notify customers of errors), and also can be utilized to report other automated corrective measures 357 (FIGS. 3 & 6) that have been performed or that are in progress (e.g., such as notifying the customers if replacements or refunds have been automatically initiated).

FIG. 6 illustrates a block diagram of a portion of system 300 comprising a delivery system 310 having an exception event handler 350 that is communicating with one or more user computers 340, according to certain embodiments shown in FIG. 3. Each of delivery system 310, exception event handler 350, and/or one or more user computers 340, is merely exemplary and not limited to the embodiments presented herein. Each of delivery system 310, exception event handler 350, and/or one or more user computers 340, can be employed in many different embodiments or examples not specifically depicted or described herein. In some embodiments, certain elements or modules of delivery system 310, exception event handler 350, and/or one or more user computers 340, can perform various procedures, processes, and/or acts. In other embodiments, the procedures, processes, and/or acts can be performed by other suitable elements or modules.

The delivery system 310 includes one or more non-transitory storage module(s) 610 and one or more processing module(s) 615, and the user computer(s) 340 include one or more non-transitory storage module(s) 611 and one or more processing module(s) 616.

The exception event handler 350 utilizes the ruleset 355 to analyze a queue 356 comprising messages 670 that provide status and tracking information 380 for shipments 370 (FIG. 3) that are being transported by carriers 360 (FIG. 3). In certain embodiments, the messages 670 include codes 675 that correlate the messages 670 to specific types of events. For example, separate codes 675 can be utilized to identify delivery exceptions 620 and to indicate other types of tracking information. Each carrier 360 (FIG. 3) can include a separate set of unique codes 675 that can be translated using the ruleset 355. In certain embodiments, the codes 675 can be comprised of alpha-numeric character strings and/or other identifying data. The exception event handler 350 can analyze and parse the messages 670 in the queue 356 to retrieve the codes 675 and utilize the codes 675 to determine whether or not delivery exceptions 620 have occurred.

The delivery exceptions 620 represent any type of complication that occurs during delivery of a shipment 370 (FIG. 3). As mentioned above, the delivery exceptions 620 can be associated with pre-defined exception types 630. Each exception type 630 corresponds to a particular type of delivery exception 620. For example, a first exception type 630 can be associated with a delivery exception 620 indicating that a shipment 370 (FIG. 3) has been damaged, a second exception type 630 can be associated with a delivery exception 620 indicating that a shipment 370 (FIG. 3) has been lost, and a third exception type 630 can be associated with a delivery exception 620 indicating that a shipment 370 (FIG. 3) has been delayed. The ruleset 355 utilized by the exception event handler 350 can easily be extended to recognize and handle additional exception types 630 and delivery exceptions 620.

The exception type 630 that is detected for a delivery exception 620 can be utilized to determine the corrective measures 357 that should be executed to resolve the relevant issue. The ruleset 355 can utilize a decision tree to determine which corrective measures to apply, and the decision tree can factor in any user-defined preferences. For example, in response to detecting that a delivery exception 620 has been received for a lost shipment 370 (FIG. 3), the ruleset 355 can be configured to automatically submit a replacement order for sending to the customer. However, if there is no replacement available, the ruleset 355 can then indicate that a refund should be issued to the customer. As another example, in response to detecting that a delivery exception 620 has been received for a damaged shipment 370 (FIG. 3), the ruleset 355 can be configured to automatically solicit feedback from the customer to determine how the customer would like to resolve the issue. Feedback can be solicited by sending an automated text message to the customer, and the customer can send a reply text message to indicate how the customer would like to resolve the issue (e.g., by sending a reply text message with "1" if the customer desires a refund or a reply text message with "2" if the customer wishes to receive a replacement). The feedback provided by the customer is sent over the network 380 (FIG. 3) to the exception event handler 350, and the corrective measure 357 selected by the customer is automatically executed by the exception event handler 350 without requiring the assistance of human interaction.

The exception event handler 350 also stores and transmits data for providing customization graphic user interfaces 640 to user computers 340 over network 380. The customers can utilize the customization graphic user interfaces 640 to specify user preferences 660. The user preferences 660 allow the customer to specify which corrective measures 357 should be taken in the event that delivery exceptions 620 occur. The customer can specify different user preferences 660 for each exception type 630. In the event that a delivery exception 620 is detected, the exception event handler 350 can utilize the user preferences 660 specified via the customization graphic user interfaces 640 to resolve the delivery exception 620. In the event that a customer has not specified user preferences 660, the exception event handler 350 can utilize a default set of rules included in the ruleset 355 to resolve delivery exceptions 620 for the customer.

In certain embodiments, the customization graphic user interfaces 640 also can permit an administrator user associated with the delivery system to modify and update the exception event handler 350. For example, the customization graphic user interfaces 640 can permit the administrator to perform functions associated with adding, editing, and deleting carriers 360 (FIG. 3) that are able to interface with the exception event handler 350. The customization graphic user interfaces 640 can permit the administrator to further perform functions for adding, editing, and deleting exception types 630 and delivery exceptions 620 associated with each carrier 360 (FIG. 3) that is interfaced with the exception event handler 350. The customization graphic user interfaces 640 can further permit the administrator to perform functions for adding, editing, and deleting corrective measures 357 for each carrier 360 (FIG. 3) interfaced with the exception event handler 350.

Although systems and methods for proactively detecting and resolving shipping exceptions have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are, or are potentially equivalents of express elements and/or limitations in the claims under the doctrine of equivalents.

What is claimed is:

1. A system comprising:
one or more processors; and
one or more non-transitory storage media storing computing instructions that, when executed on the one or more processors, cause the one or more processors to perform functions comprising:
customizing an exception event handler for a delivery system with a respective ruleset to detect respective types of delivery exceptions for each carrier of one or more carriers;
upon detecting one or more exception events in an incoming message stream, wherein the one or more exception events comprise the respective types of the delivery exceptions, proactively detecting one or more predetermined corrective measures that are available based on user preferences of a user, wherein the user comprises a recipient of a delivery, and wherein the one or more predetermined corrective measures comprise specific types of corrective measures that are taken automatically in response to detecting corresponding ones of the respective types of the delivery exceptions in the incoming message stream;
monitoring a queue of incoming messages of the incoming message stream, wherein the incoming messages are received from the one or more carriers and indicate status information for shipments being handled by the one or more carriers;
parsing content within each incoming message of the incoming message stream in the queue to retrieve one or more respective codes of sets of codes, wherein each respective code identifies whether a delivery exception occurred;
translating, by the exception event handler using the respective ruleset, the sets of codes within the incoming messages of the incoming message stream to determine whether to take respective corrective measures for each carrier of the one or more carriers when delivery exceptions occur;
determining one or more automated corrective measures that are available prior to soliciting feedback from the user, wherein the one or more automated corrective measures correspond to one or more occurrences of the respective types of the delivery exceptions, wherein each respective one of the sets of codes is unique to each carrier of the one or more carriers;
soliciting the feedback from the user for the one or more automated corrective measures of the one or more predetermined corrective measures to resolve the respective types of the delivery exceptions;
detecting a first delivery exception of the respective types of the delivery exceptions for a first incoming message of the incoming message stream from a first carrier regarding first status information for a first shipment of products being handled by the first carrier, based on the first incoming message being encoded at least in part with a first set of codes of the sets of codes that corresponds to the first delivery exception, wherein the incoming messages comprise the first incoming message, the one or more carriers comprise the first carrier, the status information comprises the first status information, the shipments comprise the first shipment of products, and the first set of codes is unique to the first carrier;
determining a first exception type for the first delivery exception based on the respective ruleset;
selecting, based at least in part on the first exception type and the feedback of the user, a first automated corrective measure of the one or more predetermined corrective measures for the first delivery exception for the first incoming message of the incoming message stream from the first carrier regarding the first status information for the first shipment of products being handled by the first carrier; and
automatically executing the first automated corrective measure of the one or more predetermined corrective measures for the first shipment of products to resolve the first delivery exception.

2. The system of claim 1, wherein:
the exception event handler stores pre-defined functions for executing the one or more automated corrective measures of the one or more predetermined corrective measures comprising:
automatically issuing refunds in response to the respective types of the delivery exceptions being detected;
automatically submitting replacement orders in response to the respective types of the delivery exceptions being detected;
automatically transmitting notifications to intended recipients in response to the respective types of the delivery exceptions being detected; and
automatically soliciting feedback from the intended recipients to determine one or more of the user preferences in response to the respective types of the delivery exceptions being detected; and
automatically executing the first automated corrective measure of the one or more predetermined corrective measures comprises executing one or more of the pre-defined functions for the one or more automated corrective measures.

3. The system of claim 2, wherein the computing instructions, when executed on the one or more processors, further cause the one or more processors to perform functions comprising:
configuring the exception event handler to interact with:
a communication system that is configured to solicit the feedback from the intended recipients and to transmit the notifications to the intended recipients;
an order management system that enables the replacement orders to be submitted in response to the respective types of the delivery exceptions being detected; and
a transaction system that enables the refunds to be issued to the intended recipients in response to the respective types of the delivery exceptions being detected;

configuring the exception event handler for the delivery system with a set of rules to detect one or more events that are not delivery exceptions in the incoming message stream; and upon detection of the one or more events, executing automated actions, via the exception event handler, associated with the one or more events.

4. The system of claim 1, wherein the respective types of the delivery exceptions indicate that shipments are damaged, lost, or delayed.

5. The system of claim 1, wherein the respective ruleset detects the first exception type for the first delivery exception by analyzing one or more codes of the first set of codes included in the first incoming message.

6. The system of claim 1, wherein the respective ruleset utilized by the exception event handler comprises a customized set of rules for each carrier of the one or more carriers that determine how the respective types of the delivery exceptions for each carrier of the one or more carriers are handled.

7. The system of claim 1, wherein one or more customization graphic user interfaces on an electronic device is accessible by an intended recipient of the first shipment of products over a network to enable the intended recipient to specify user preferences for handling the first delivery exception when the first delivery exception occurs.

8. The system of claim 7, wherein the one or more customization graphic user interfaces permit the first automated corrective measure of the one or more predetermined corrective measures to be correlated to the first exception type.

9. The system of claim 1, wherein the computing instructions, when executed on the one or more processors, further cause the one or more processors to perform functions comprising:

displaying a customization graphic user interface comprising functions for:

adding, editing, and deleting each of the one or more carriers that are able to interface with the exception event handler;

adding, editing, and deleting respective exception types for each of the one or more carriers that are able to interface with the exception event handler, wherein the respective exception types for the first carrier comprise the first exception type; and adding, editing, and deleting respective automated corrective measures of the one or more predetermined corrective measures for each of the one or more carriers that are able to interface with the exception event handler, wherein the respective automated corrective measures of the one or more predetermined corrective measures for the first carrier comprise the first automated corrective measure.

10. The system of claim 1, wherein the exception event handler monitors the queue of the incoming messages in real-time.

11. A method being implemented via execution of computing instructions to run on one or more processors stored at one or more non-transitory computer-readable media, the method comprising:

customizing an exception event handler for a delivery system with a respective ruleset to detect respective types of delivery exceptions for each carrier of one or more carriers;

upon detecting one or more exception events in an incoming message stream, wherein the one or more exception events comprise the respective types of the delivery exceptions, proactively detecting one or more predetermined corrective measures that are available based on user preferences of a user, wherein the user comprises a recipient of a delivery, and wherein the one or more predetermined corrective measures comprise specific types of corrective measures that are taken automatically in response to detecting corresponding ones of the respective types of the delivery exceptions in the incoming message stream;

monitoring a queue of incoming messages of the incoming message stream, wherein the incoming messages are received from the one or more carriers and indicate status information for shipments being handled by the one or more carriers;

parsing content within each incoming message of the incoming message stream in the queue to retrieve one or more respective codes of sets of codes, wherein each respective code identifies whether a delivery exception occurred;

translating, by the exception event handler using the respective ruleset, the sets of codes within the incoming messages of the incoming message stream to determine whether to take respective corrective measures for each carrier of the one or more carriers when delivery exceptions occur;

determining one or more automated corrective measures that are available prior to soliciting feedback from the user, wherein the one or more automated corrective measures correspond to one or more occurrences of the respective types of the delivery exceptions, wherein each respective one of the sets of codes is unique to each carrier of the one or more carriers;

soliciting the feedback from the user for the one or more automated corrective measures of the one or more predetermined corrective measures to resolve the respective types of the delivery exceptions;

detecting a first delivery exception of the respective types of the delivery exceptions for a first incoming message of the incoming message stream from a first carrier regarding first status information for a first shipment of products being handled by the first carrier, based on the first incoming message being encoded at least in part with a first set of codes of the sets of codes that corresponds to the first delivery exception, wherein the incoming messages comprise the first incoming message, the one or more carriers comprise the first carrier, the status information comprises the first status information, the shipments comprise the first shipment of products, and the first set of codes is unique to the first carrier;

determining a first exception type for the first delivery exception based on the respective ruleset;

selecting, based at least in part on the first exception type and the feedback of the user, a first automated corrective measure of the one or more predetermined corrective measures for the first delivery exception for the first incoming message of the incoming message stream from the first carrier regarding the first status information for the first shipment of products being handled by the first carrier; and automatically executing the first automated corrective measure of the one or more predetermined corrective measures for the first shipment of products to resolve the first delivery exception.

12. The method of claim 11, wherein:
the exception event handler stores pre-defined functions for executing the one or more automated corrective measures of the one or more predetermined corrective measures comprising:
  automatically issuing refunds in response to the respective types of the delivery exceptions being detected;
  automatically submitting replacement orders in response to the respective types of the delivery exceptions being detected;
  automatically transmitting notifications to intended recipients in response to the respective types of the delivery exceptions being detected; and
  automatically soliciting feedback from the intended recipients to determine one or more of the user preferences in response to the respective types of the delivery exceptions being detected; and
automatically executing the first automated corrective measure of the one or more predetermined corrective measures comprises executing one or more of the pre-defined functions for the one or more automated corrective measures.

13. The method of claim 12, further comprising:
configuring the exception event handler to interact with:
  a communication system that is configured to solicit the feedback from the intended recipients and to transmit the notifications to the intended recipients;
  an order management system that enables the replacement orders to be submitted in response to the respective types of the delivery exceptions being detected; and
  a transaction system that enables the refunds to be issued to the intended recipients in response to the respective types of the delivery exceptions being detected; and
configuring the exception event handler for the delivery system with a set of rules to detect one or more events that are not delivery exceptions in the incoming message stream; and
upon detection of the one or more events, executing automated actions, via the exception event handler, associated with the one or more events.

14. The method of claim 11, wherein the respective types of the delivery exceptions indicate that shipments are damaged, lost, or delayed.

15. The method of claim 11, wherein the respective ruleset detects the first exception type for the first delivery exception by analyzing one or more codes of the first set of codes included in the first incoming message.

16. The method of claim 11, wherein the respective ruleset utilized by the exception event handler comprises a customized set of rules for each carrier of the one or more carriers that determine how the respective types of the delivery exceptions for each carrier of the one or more carriers are handled.

17. The method of claim 11, wherein one or more customization graphic user interfaces on an electronic device is accessible by an intended recipient of the first shipment of products over a network to enable the intended recipient to specify user preferences for handling the first delivery exception when the first delivery exception occurs.

18. The method of claim 17, wherein the one or more customization graphic user interfaces permit the automated first corrective measure of the one or more predetermined corrective measures to be correlated to the first exception type.

19. The method of claim 11, further comprising:
displaying a customization graphic user interface comprising functions for:
  adding, editing, and deleting each of the one or more carriers that are able to interface with the exception event handler;
  adding, editing, and deleting respective exception types for each of the one or more carriers that are able to interface with the exception event handler, wherein the respective exception types for the first carrier comprise the first exception type; and
  adding, editing, and deleting respective automated corrective measures of the one or more predetermined corrective measures for each of the one or more carriers that are able to interface with the exception event handler, wherein the respective automated corrective measures of the one or more predetermined corrective measures for the first carrier comprise the first automated corrective measure.

20. The method of claim 11, wherein the exception event handler monitors the queue of incoming messages in real-time.

* * * * *